United States Patent [19]
Mason

[11] 3,788,371
[45] Jan. 29, 1974

[54] SAW APPARATUS WITH DISK BED SUPPORT FOR LUMBER

[75] Inventor: Howard C. Mason, Oregon City, Oreg.

[73] Assignee: H. C. Mason & Associates, Inc., Gladstone, Oreg.

[22] Filed: June 26, 1972

[21] Appl. No.: 266,214

[52] U.S. Cl. ............... 144/312, 83/101.1, 83/922, 144/246 C, 144/249 R, 193/37, 83/436
[51] Int. Cl. ............................................. B27b 1/00
[58] Field of Search .. 193/37; 83/436, 425.2, 425.3, 83/425.4, 102.1, 404.2, 403.1, 922; 144/242 C, 246 C, 162, 249 R, 309, 312

[56] References Cited
UNITED STATES PATENTS

| | | | |
|---|---|---|---|
| 408,790 | 8/1889 | Butler | 83/102.1 |
| 1,744,874 | 1/1930 | Edwards | 144/249 R |
| 2,925,107 | 2/1960 | Fitzwater | 144/208 E |
| 2,832,383 | 4/1958 | Schuster | 144/246 C X |
| 2,788,852 | 4/1957 | Sharpe | 83/922 X |
| 2,780,254 | 2/1957 | Carpentiere | 144/249 R |
| 1,095,444 | 5/1914 | Alvey | 193/37 |

Primary Examiner—Andrew R. Juhasz
Assistant Examiner—W. D. Bray
Attorney, Agent, or Firm—Kolisch, Hartwell & Dickinson

[57] ABSTRACT

Saw apparatus for cutting lumber along its length. The apparatus has a disk bed for supporting the lumber as the same moves during cutting, including multiple disks disposed in rows and spaced laterally from each other along the direction of travel of the lumber. The lumber is forced downwardly against the disks by pressure-applying instrumentalities, at a sufficient pressure to cause the disk edges slightly to penetrate the wood on the underside of the lumber without substantially exceeding the elastic limit of the wood. Cutting is performed while the forward travel of the lumber is so controlled. The pressure-applying instrumentalities are so adjusted as to permit the lead end of a lumber piece to pass therebeyond before coming down to produce the pressure. A method of cutting lumber along its length where the lumber is moved over a multiple-disk bed and the lumber is pressed downwardly against the disks in such bed with upper edges penetrating the wood in the lumber during the process of the cutting.

9 Claims, 6 Drawing Figures

SAW APPARATUS WITH DISK BED SUPPORT FOR LUMBER

This invention relates generally to saw apparatus, and more particularly to apparatus of the type that may be used to cut lumber along its length to produce multiple boards of lesser width and/or thickness, or to trim the lumber to remove waste along edges. Such apparatus includes what is known as resaw machines, edger, etc.

In the cutting of lumber in the manner above indicated, optimum production is realized when the cuts produced by the saw are exactly straight and extend along the length of the lumber with such exactly paralleling a predetermined datum line. With accurate cutting as described, the dimensions of the cut lumber tend to be substantially uniform along the length of the lumber, reducing to a minimum any allowance that otherwise must be made if the lumber is to have a width and thicknesses not below a specified minimum.

In general terms, this invention has as an object thereof the provision of novel apparatus for cutting lumber which has been found to result in appreciably more accurate cutting than is possible with most conventional forms of equipment.

A related object is to provide such apparatus which is relatively simple in construction and easy to maintain.

A more specific object of the invention is to provide saw apparatus featuring what is referred to herein as disk bed for supporting the lumber as it is sawed, with plural raws of multiple disks in such bed, which a lumber piece is forced down against after properly being indexed, and before and during cutting. With this pressure applied, the edges of the disk slightly penetrate the wood on the underside of the lumber with the result that the lumber is caused to move over the disks with any tendency for the lumber to twist or turned during such travel reduced to a minimum.

Yet another object of the invention is to provide improved saw apparatus which is particularly well-adapted for the handling of lumber cut from the more resinous woods. In this connection, it should be pointed out that a wood such as the Douglas fir contains a considerable amount of resin, which in a piece of cut lumber may appear as an exposed pitch pocket or other type of pitch collection. When lumber of this description is handled on a conventional conveyor system, the wood resins accumulate on the conveying means in the system, and these accumulations can produce a number of problems, including interferring with the production of an accurate cut by reason of producing a displacement in the position of the lumber as such is conveyed thereacross. With the instant invention, and utilizing a disk bed with disks of the type hereinafter described, such resin build-ups are substantially reduced if not eliminated. This is because the edge area of any given disk which actually contacts the lumber is so small that there is not sufficient area presented for the resin to adhere to in any premanent fashion. The disks, during their rotation and with lumber traveling thereacross, tend to remain clean while performing their very important function of guiding the lumber in a straight path through the saw station of the apparatus.

According to a prefereed embodiment of the invention, lumber is pressed downwardly against the disk bed referred to, utilizing pressure-applying instrumentality such as pressure rollers. These preferably are positioned in such a manner that during the travel of lumber through the apparatus, and while such is being sawed, at least one and preferably two are performing their pressure-applying function. The rollers, by being power driven, also provide a means for propelling the lumber through the equipment. It is contemplated preferably that each roller means during the passage of a lead or tail end of a lumber piece thereunder be lifted from the lumber to permit such to pass freely therebelow. In this manner any displacing acting in the lumber by reason of an end abruptly coming up against or leaving a pressure roller is prevented.

Yet a further object of the invention is to provide a novel method of processing lumber by cutting it, which enables the production of straight cuts accurately paralleling some datum plane.

These and other objects and advantages are attained by the invention, which is described in more detail below in conjunction with the accompanying drawings, wherein.

Figure 1:
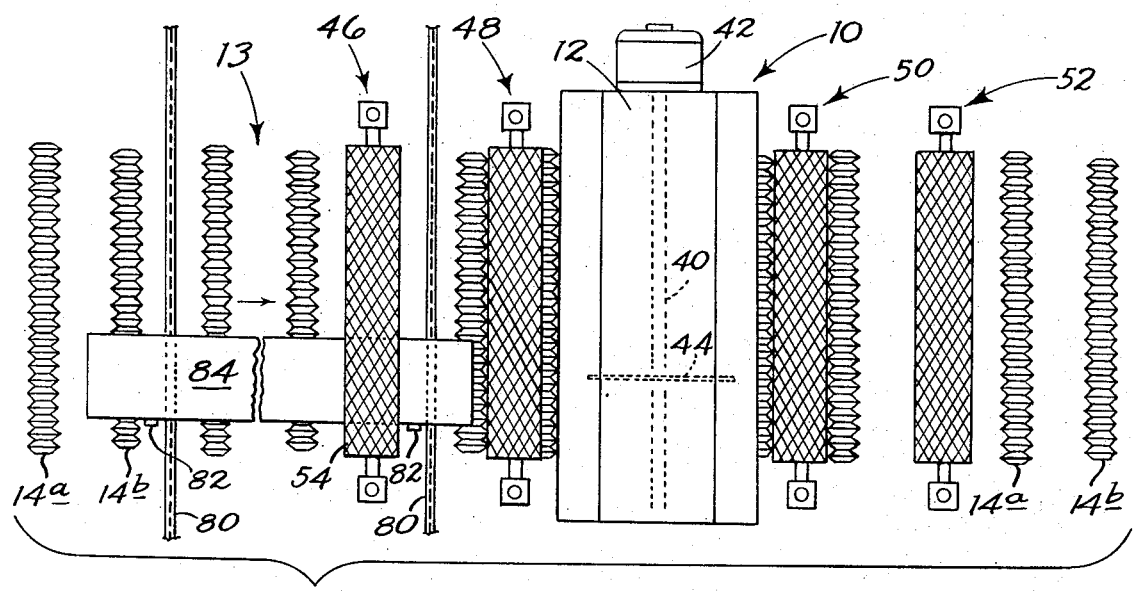
FIG. 1 is a top plan view, somewhat simplified, of apparatus as contemplated herein.
Figure 2:
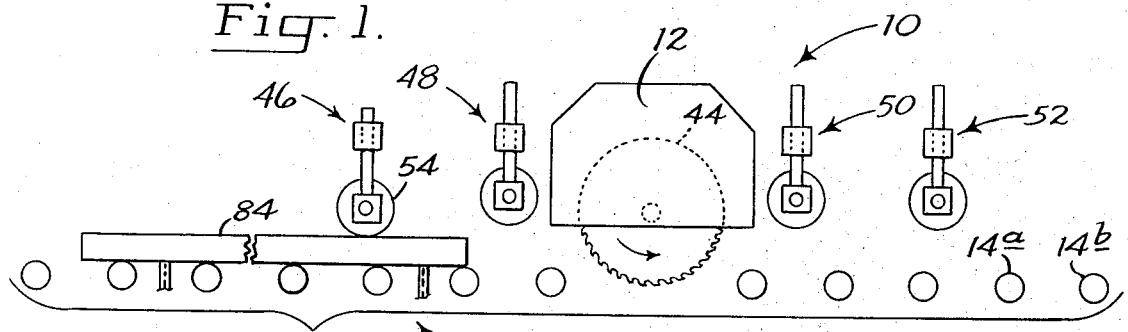
FIG. 2 is a side elevation of the apparatus illustrated in FIG. 1.

Referring now to the drawings, illustrated somewhat in simplified form in FIGS. 1 and 2 is saw apparatus indicated at 10. The saw apparatus includes an infeed side which is at the left of the figures, where lumber is deposited prior to traveling through the apparatus, and an off bearing side located to the right of the figures.

Lumber cut using apparatus 10 travels from the infeed side past a saw station indicated at 12 to the off bearing side of the machine. The lumber, when moving in this manner, is supported on what is refereed to herein as a disk bed 13, featuring multiple disks defining a plane of support for the lumber as will be described in greater detail.

The disk bed in the specific embodiment of the invention disclosed includes plural rows of disks, each comprising a bank of multiple disks, the rows being spaced laterally from each other extending from the infeed to the off bearing side of the machine. In FIGS. 1 and 2, the rows of disks have been given the reference numerals 14a and 14b, with a row of disks 14b alternating with a row of disks 14a progressing to the off bearing side of the machine.

Figure 3:
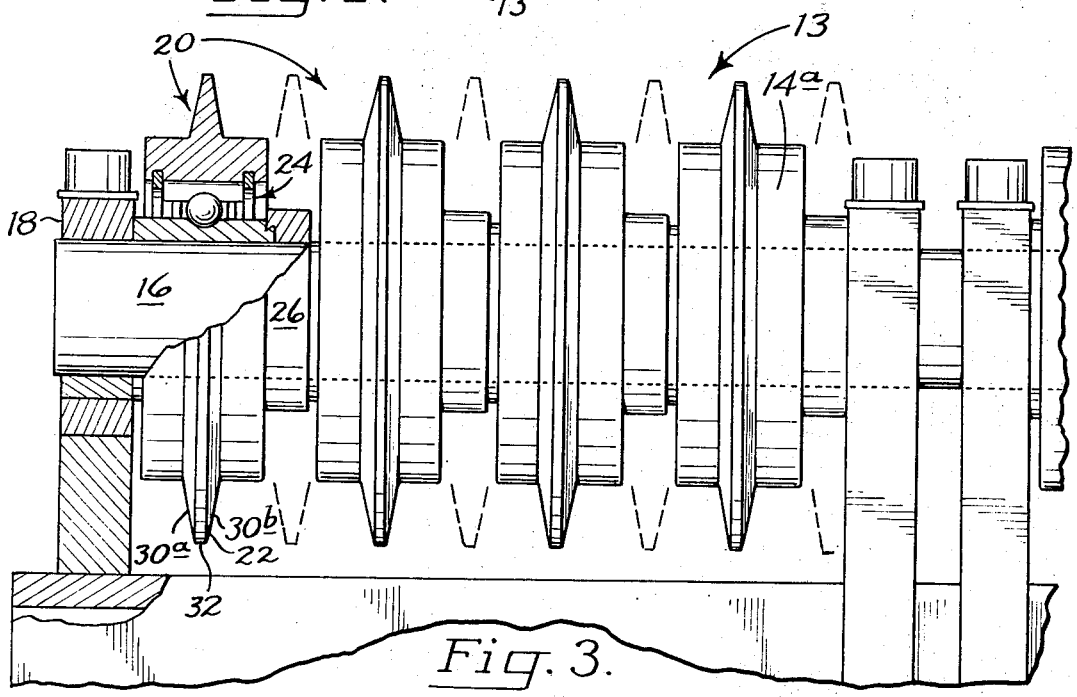
FIG. 3 is an enlarged view of portions of the disk bed contemplated.

Referring now to FIG. 3 illustrating in greater detail the construction of a row of disks, thhe row 14a illustrated comprises a roll shaft 16 supported at its ends and points distributed along its length by clamp blocks such as the one shown at 18. Mounted on the roll shaft and following one another along the length of the shaft are disk assemblies 20. Each may comprise a disk 22 journaled on the roll shaft by ball bearing assembly 24 which is secured on the roll shaft by a lock collar 26.

Disks 22 of the row of disks all have the same diameter, and the diameter of the disks of one row are the same as the diameter of the disks of the other rows. The roll shafts mounting the various rows of disks are parallel to each other, all occupying a horizontal position extending normal to the flow of lumber through the apparatus and all having the same elevation in the disk bed. As a consequence, the upper edges of the various disks define a common, generally horizontally extending plane.

The construction of a row of disks 14b is substantially the same as the row 14a just described, the primary difference between the two rows being that the disks 22 of the rows 14b are offset laterally from the disks 22 in the rows 14a on either side. In other words, the disks of one row are staggered with respect to the disks of the rows on either side. With this type of an organization, maximum stability is provided for the underside of lumber traveling over the disk bed.

Each of the various disks in thhe rows includes an annular flange portion bounded by opposite faces 30a, 30b which converge on each other progressing radially outwardly on the disk. The circumference or perimeter of each disk is bounded by an edge shown at 32.

Figure 6:
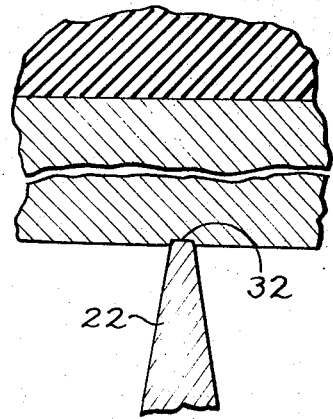
FIG. 6 illustrates on an enlarged scale the action of a disk on lumber when such passes thereover.

As contemplated by this invention, the thickness of edge 32 is selected so that with moderate pressure exerted downwardly on lumber riding over a disk such will penetrate slightly the wood of the lower surface of the lumber without such penetration being such as to cause noticeable and permanent score lines along the lumber. In determining the thickness of this edge, the compression index of the particular species of wood should be considered as well as the size of the lumber stock being processed (which through its weight alone will cause a certain downward force to be exerted on the underlying disk bed). With the usual soft wood, such as conifers, as exemplified by Douglas fir, such has a hardness or compression index lying somewhere betwen 280 and 850. With such wood, and with the usual moisture content the wood has prior to drying, it has been found that preferably the apparatus should be constructed so that somewhere between about 15 and 25 pounds be supported by each disk during the travel of the lumber as the same is being cut. With such a loading of each disk, it has been found that preferably the thickness of edge 32 when handling Douglas fir should lie within the range of about 0.080 to 0.10 inch. Hardwoods have a somewhat higher compression index, typically ranging from about 1,000 to 2,000. With such materials, in order to obtain adequate penetration, the thickness of edge 32 may be somewhat less than the thickness just described. Thus, and with hardwoods, typically the thickness of such edge may range from about 0.040 to 0.060 inch. With dimensions as discussed, and with propoer application of pressure using pressure-imparting instrumentalities as will be described, the lumber on passing over the disks is indented by the disk peripheries, but the indentation is not so great as to excede what might be thought of as the elastic limit of the wood. As a consequence, as the lumber material passes over a disk it tends to be held from skewing or shifting sidewise, but the indentation of a disk is not such as to leave a permanent score line in the wood when such is inspected after having passed through the saw apparatus. The action of a disk is shown in exaggerated form in FIG. 6.

Hardness or compression index, as used herein, refers to the load in pounds required to embed a 0.444-inch ball to one-half its diameter, as set forth in USDA Wood Handbook, published as Agriculture Handbook No. 72, dated 1955.

Saw station 12 has been described briefly. This may take a number of different forms. For purpose of illustration, the saw station is illustrated as including a saw arbor 40 which extends horizontally across the path of the lumber through the machine in a position generally parallel to roll shaft 16. The arbor is turned by a power-operated means such as a motor 42. Mounted on the arbor for rotation with the arbor is a circular saw 44. With the particular organization of the type illustrated in FIG. 2, the saw during operation is rotated in a counterclockwise direction in such figure. This causes the teeth of the saw to move downwardly into the wood as the sawing progresses, the lower edge of the saw extending below the plane of support rendered by the disks. The action of the saw is such as to tend to urge the work downwardly against the disks thus to promote stability.

The saw apparatus illustrated further includes means for applying pressure to the top of lumber processed in the apparatus and supported on the disk bed described. In the particular embodiment of the invention illustrated, such comprises four pressure roller assemblies, indicated at 46, 48, 50 and 52. Each pressure roller assembly includes a roller, such as the roller shown at 54, coated with rubber or other elastomer to provide greater traction. A pair of such pressure rollers are shown disposed on each side of the saw station. The distribution of the pressure rollers is such that, with lumber passing through the saw apparatus, preferably at least one and usually two pressure rollers at all times are engaging such lumber.

Means is provided for rotating the various rollers under power, whereby the lumber is propelled throught the apparatus. Also, each of the pressure rollers is mounted in such a manner as to permit the same to be moved vertically indepently of the other pressure rollers.

Figure 4:
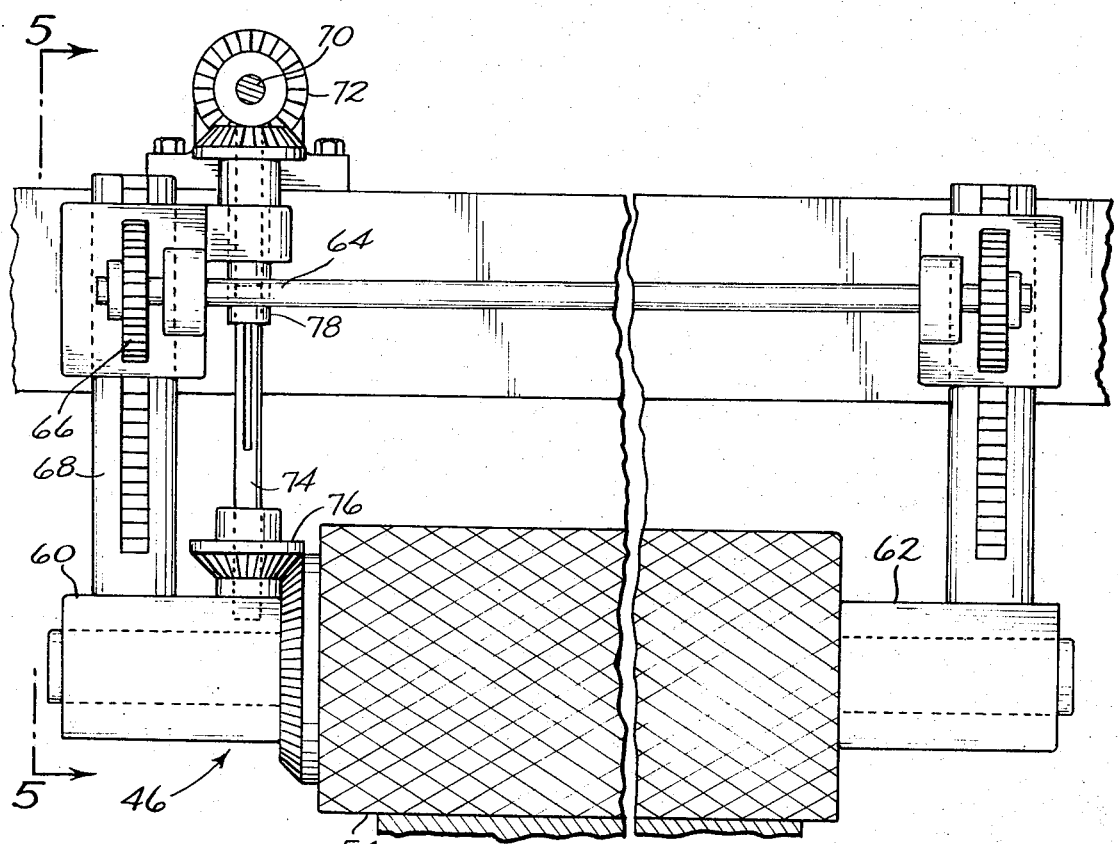
FIGS. 4 and 5 illustrate portions of pressure rollers in the equipment.
Figure 5:
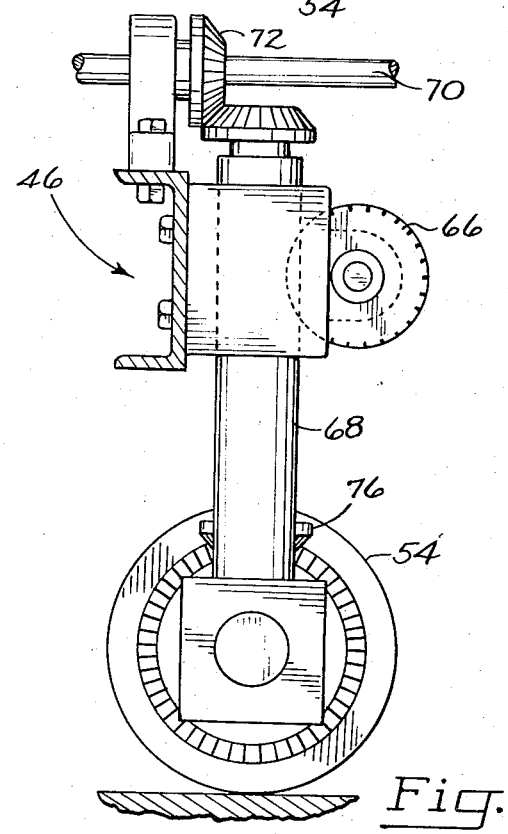

The mounting for such rollers in FIGS. 1 and 2 has for the most part been omitted, in order best to illustrate the concepts of the present invention in simplified form. Portions of a suitable mounting have been illustrated in greater detail in FIGS. 4 and 5. With reference to these figures, it will be noted that the roller 54 illustrated has opposite ends journaled in mountings 60, 62 which are raised and lowered by turning of a shaft 64, with pinion gears 66 engaging racks 68 secured to the mountings 60, 62. suitable power-operated means is provided for turning the shaft such as a fluid-powered ram, not shown. Rotary movement is imparted to the roll through power-driven shaft 70, bevel gear 72 transmitting drive to a shaft 74, and bevel gear 76. Shaft 74 is splined and telescopically received within driven sleeve 78, to accommodate vertical movement of the roll.

Lumber is deposited on the disk bed, on the feed end thereof, using feed chains 80 shown in FIG. 1. The upper runs of these chains are mounted in a suitable manner, to permit them to be dropped below the top plane of the disks in the bed whereby lumber supported on the chains becomes supported on the disks. Lumber carried into the apparatus may be properly indexed, as by stops 82, to establish a datum plane for one edge of the lumber which extends normal to the axes of the roll shafts 16 and the saw arbor.

Utilizing the apparatus of the invention and practicing the method contemplated herein, lumber is deposited on the feed end of the disk bed, with roller assembly 46 raised to accommodate the movement of the lumber onto the bed underneath the roller assembly. In the absence of other lumber in the saw apparatus, of course, the other pressure rollers assemblies are raised also. With lumber on the disk bed at the feed end, as exemplified by piece of lumber 84, pressure roller 46 is lowered, to press the lumber firmly against the disk in the disk bed.

With the pressure roller forced downwardly on the top of the lumber, the same starts its forward motion through the saw apparatus. Pressure roller assembly 48 is maintained raised until after the lead end of the lumber has passed beneath the roller assembly. In this way, any tendency for the lumber to be skewed by reason of its end (such rarely are truly square) coming up against a lowered roll, is eliminated. With the lumber advanced to pass under pressure roller assembly 48, and to a position where the same is supported by the row of disks immediately on the feed side of the saw, the roller assembly 48 is lowered, whereby assemblies 46 and 48 can jointly serve to pass the lumber against the disks. As the lumber progresses the same is cut while maintained as indexed, by the operation of the disks which lightly penetrate the undersurface of the lumber. As the tail end of the lumber moves adjacent roller assembly 46, but before such actually moves under thee roller assembly, such is raised, again to inhibit any shifting action due to the pressure roller moving off an unsquared end. This sequence of down and up movement is repeated by each of the pressure roller assemblies following assembly 46, i.e., assemblies 48, 50, and 52, as the lumber progresses.

Illustrating a particular manufacture, Douglas fir slabs of some 4-inch thickness and 6-inch width were processed using the saw apparatus described. The disks in the disk bed had approximately 6-inch diameters, and a lateral spacing in a row of approximately 2 ½ inches. The rows themselves were spaced approximately 15 inches apart. With controlled pressure exerted downwardly on the lumber piece, it was determined that approximately 20 pounds of force was exerted on each disk where such provided support for the lumber opposite a pressure roller means. The lumber passed through the apparatus without any noticeable turning of the lumber as it progressed. On the underside of the lumber after processing no observable score lines were noted.

Using the invention, both hard and soft woods may be processed, with ordinarily the use of somewhat narrower edged disks in the case of hardwood, to enable proper penetration to be produced without the use of more than moderate force on the pressure rollers.

What is claimed and desired to secure by letters patent:

1. Saw apparatus for cutting lumber along its length comprising
   a horizontally disposed power-driven saw arbor and a saw mounted on said arbor for rotation therewith,
   a multiple-disk bed disposed under said arbor defining a path of travel for lumber extending transversely of and beneath said arbor,
   said disk bed including multiple disks on the infeed and off bearing sides of said arbor journaled for rotation about axes paralleling the axis of said arbor with the tops of the disks occupying substantially a common horizontal plane, and
   pressure-applying mechanism overlying said disk bed for applying pressure to the top of lumber supported by said disks while such lumber is propelled forwardly under the saw arbor whereby the disks penetrate the wood of the underside of the lumber without substantially exceeding the elastic limit of the wood in the lumber, said pressure-applying mechanism including means on the feed side of said arbor which is releasable to enable the placement of lumber thereunder before the application of pressue thereby.

2. The saw apparatus of claim 1, wherein said pressure-applying mechanism comprises a pressure roller means on the infeed side of said saw arbor which may be raised and lowered to elevate the roller means to to press down on, respectively, lumber disposed under the roller means.

3. The saw apparatus of claim 2, wherein said pressure-applying mechanism further comprises another pressure roller means on the off bearing side of the saw arbor which may be raised and lowered to elevate the means above and to press down on, respectively, lumber disposed under the roller means, and wherein means is provided for producing such movement in said first-mentioned and said other roller means in sequence.

4. The saw apparatus of claim 1, wherein the disks of said said disk bed are bounded by circumferential edges not exceeding about 1/10 inch in width.

5. The saw apparatus of claim 1, wherein the disks of said disk bed are distributed in rows, with such rows spaced laterally from each other progressing from the feed to the off bearing side of the saw apparatus, said disks of one row are staggered with respect to disks of adjacent rows, and the disks are bounded by circumferential edges not exceeding about 1/10 of an inch in thickness.

6. Saw apparatus for cutting lumber stock along its length comprising
   a multiple-disk bed defining a path of travel for lumber from feed to off bearing sides of the saw apparatus,
   said disk bed comprising rows of plural disks with the rows of disks being laterally spaced from each other progressing from the feed to off bearing side of the apparatus, the disks of a row being rotatable about a common axis and the rotation axes of the rows of disks paralleling each other and extending horizontally and in a direction extending transversely of the path of travel of lumber through the apparatus, the tops of the disks defining a common plane in the disk bed,
   a saw mounted on a plane normal to the bed which parallels the path of travel of lumber from feed to off bearing sides of the saw apparatus and adapted to cut lumber resting on said bed, and
   pressure-applying mechanism overlying said disk bed for applying pressure to the top of lumber supported by said disk bed while such lumber is propelled forwardly past the saw whereby the disks of said bed penetrate the wood of the underside of the lumber without substantially exceeding the elastic limit of the wood, said pressure-applying mechanism including means on the feed side of said saw which is releasable to enable the placement of lumber thereunder before the application of pressure thereby.

7. The apparatus of claim 6, wherein said mechanism for applying pressure to the top of lumber comprises at least a pair of pressure roller means with one disposed on the infeed side of said saw and one disposed on the off bearing side of said saw, each of said pressure roller means being rotatably about an axis paralleling the axes of the rows of disks, each of said pressure roller means being rotated under power whereby the same is effective to propel lumber through the saw apparatus passing under the roller means, each of said pressure roller means being raisable and lowerable to elevate the roller means above and to press down on lumber disposed beneath the roller means, respectively, means being provided for raising and lowering each pressure roller means independently of the other.

8. A method of cutting lumber along its length comprising providing a continuous bed for the travel of the lumber in the form of plural disks which during travel of the lumber support the lumber at points distributed throughout the length and width of the lumber, the disks being journaled for rotation about parallel axes and having top edges lying in a common plane, moving the lumber over the disks in a direction extending normal to the disk axes, while moving the lumber pressing it downwardly against the disks whereby upper edges penetrate the wood in the lumber without substantially exceeding the elastic limit of the wood as demonstrated by lack of permanent score lines in the lumber after passing over the disks, and as the lumber is pressed against the disks and moving thereover cutting the lumber with a kerf which extends normal to the disk rotation axes, said cutting of the lumber being performed with a saw blade moving in a cutting path downwardly through the lumber whereby the blade tends to drag the lumber against the disks.

9. The method of claim 8, wherein the lumber is pressed against the disks at pressure regions disposed on the feed and off bearing sides, respectively, of where the cutting is performed, and pressure is applied to lumber at a pressure region not until the lead end of the lumber has advanced beyond the pressure region.

* * * * *